United States Patent
Kisteneich et al.

[15] 3,706,516
[45] Dec. 19, 1972

[54] APPARATUS FOR PRODUCING FOAM SECTIONS FROM COMPONENTS THAT REACT QUICKLY WITH ONE ANOTHER WHEN MIXED

[72] Inventors: Heinz Kisteneich, Birlinghoven; Ferdinand Proksa, Bergisch-Neukirchen, both of Germany

[73] Assignee: Maschinenfabrik Hennecke GmbH, Leverkusen, Germany

[22] Filed: May 16, 1969

[21] Appl. No.: 825,283

[30] Foreign Application Priority Data

May 24, 1968 Germany.....................P 17 78 693.5

[52] U.S. Cl. ..................425/141, 425/145, 425/149, 425/371, 264/51
[51] Int. Cl. ...............................................B29f 1/06
[58] Field of Search ..18/2 HA, 4 B, 5 P, 5 A, 30 CV; 264/51, 52, 53, 54, 55

[56] References Cited

UNITED STATES PATENTS

| | | | |
|---|---|---|---|
| 2,786,234 | 3/1957 | Beyer | 18/30 CV X |
| 3,274,643 | 9/1966 | Oxel | 18/4 B |

*Primary Examiner*—J. Spencer Overholser
*Assistant Examiner*—Lucius R. Frye
*Attorney*—Burgess, Dinklage & Sprung

[57] ABSTRACT

In the production of foamed articles wherein the foam producing reaction occurs between the belts of a double belt conveyor and the double belt conveyor serves as a mold, the pressure of the foaming reaction of the belts is sensed and, to obtain a uniform structure in the product, the feed rate of the components reacting to from the foam, per unit area of the belt, is correspondingly varied.

9 Claims, 3 Drawing Figures

3,706,516

PATENTED DEC 19 1972

Heinz Kisteneich
Ferdinand Proksa   INVENTOR.

BY
Burgens, Dinklage & Grining
Attorneys for Applicants

APPARATUS FOR PRODUCING FOAM SECTIONS FROM COMPONENTS THAT REACT QUICKLY WITH ONE ANOTHER WHEN MIXED

This invention relates to a process and an apparatus for producing foam sections or shapes, flat sections in particular, from components that quickly react chemically together when mixed to form foams, on a foaming machine in the form of a double conveyor belt in which the lower belt carries a supporting sheet or rigid cover layer, for example in the form of plate or panel, to which the liquid reaction mixture is applied, being foamed in the space of predetermined, constant height between the upper belt and the lower belt and exerting a foaming pressure on the two belts.

The aforementioned process and the apparatus in which it is carried out are applicable in particular to the production of polyurethane foam sections, although they may also be used for the production of sections from polystyrene foam, polyamide foam or other foams that can be similarly produced.

Fluctuations either in the feed or in the density of the delivered components, leaky valves and so on do not however provide for uniform initial conditions which would guarantee a corresponding homogeneous end product.

Since the height of the foam section has to be kept constant during production, the interval between the upper belt and the lower belt must also remain fixed. In consequence of this, however, the foaming pressure varies during production with the result, that, as already mentioned, the end product lacks uniformity.

The object of this invention is to eliminate the deficiencies referred to above.

According to the invention, this object is achieved by virtue of the fact that the foaming pressure is kept constant in that it is measured and, in the event of fluctuations from its required value, the quantity in which the reaction mixture is delivered per unit area is altered accordingly. If the foaming pressure threatens to rise, the quantity of reaction mixture delivered is reduced in proportion. If the foaming pressure threatens to fall, the quantity of reaction mixture delivered is increased accordingly.

In one particular embodiment of the process, the reaction force or pressure exerted on the belts, which is equivalent to the foaming pressure, is measured, i.e. the force or pressure which is exerted by the double conveyor belt in response to the foaming pressure of the foam in the process of formation.

Whether it is more favorable directly to use the foaming pressure or the indirect reaction force or pressure as criterion for the regulating operation will depend upon the particular design of the foaming machine and is merely something for experts to determine.

In a particular embodiment of the process, the feed rate per unit area is influenced by varying the speed of the conveyor belts, i.e., when the foaming pressure or reaction force shown a tendency to increase for example, the rate of travel of the belts is increased proportionately.

In an equivalent embodiment of the process according to the invention, the feed rate per unit area is regulated by varying the feed rate per unit of time.

In principle, both the aforementioned particular embodiments of the process may be carried out in any type of foaming machine known per se providing it is appropriately modified to meet the requirements of the invention. In this case, too, however, the more favorable of the two embodiments of the process should be selected for an existing foaming machine.

So far as the particular embodiments of the associated foaming machine according to the invention are concerned, the various embodiments described in the following are basically applicable to any type of foaming machine providing it is appropriately modified where necessary.

However, a few characteristically designed foaming machines have already been brought on to the market, in which case a particularly suitable embodiment of the invention is applicable to each of them:

A first foaming machine consists essentially of a driven double conveyor belt with an upper belt and a lower belt, and of a combined mixer and applicator. The novel and, for this embodiment, particularly advantageous aspect is that arranged in the vicinity of the double conveyor belt there is a means for measuring the foaming pressure which is coupled through a regulator and a servomotor with the motor used to drive the double conveyor belt. This embodiment is particularly simple and in principle is applicable to any type of foaming machine. However, in cases where the foaming machine is equipped with an automatic feeder system,—for example for cover layer panels or the like, and with an automatic take-off unit for the sections produced, an irregular rate of travel for the double conveyor belt is undesirable in some cases.

Accordingly, the invention provides further embodiments:

In the second foaming machine consisting of a driven double conveyor belt with an upper belt and a lower belt, and of a combined mixer and applicator equipped with feed pumps for the individual components, a means for measuring the foaming pressure in the vicinity of the double conveyor belt, being coupled through a regulator and a servomotor with the pumps for delivering the components of the combined mixer and applicator. Depending on whether the foaming pressure shows a tendency to fall or rise, the output of the feed pumps is increased or reduced proportionally. Providing the feed pumps are suitably designed, this can be achieved adjusting their stroke or even by varying the rotational speed of the motors used to drive the feed pumps.

In a third foaming machine consisting of a driven double conveyor belt with an upper belt and a lower belt and of a combined mixer and applicator equipped with feed pumps uniformly delivering the components, adjustable throttle means being provided in the feed lines between the feed pumps and the mixers, a means for measuring the foaming pressure is arranged in accordance with the invention in the vicinity of the double conveyor belt, being coupled with the throttle means through a regulator and a servomotor. If the foaming pressure threatens to rise or fall, the throttle means are opened to a greater or lesser extent in proportion to the rise or fall.

A particular embodiment of the invention is applicable to all the different designs of the foaming machine described above. In this embodiment, at least one of the two belts i.e. the upper belt or the lower belt is equipped with a counterpressure means on which the foaming pressure gauge is arranged. Although in this case the foaming pressure is measured indirectly as the reaction force or pressure, this is merely an equivalent technical variation producing the same effect as direct measurement of the pressure.

In a particularly advantageous embodiment known per se, the frame of the upper belt and lower belt are joined together by means of elastic connecting means. These elastic connecting means, for example telescopic parallelogram guides, on the one hand arrest the foaming pressure and on the other hand are loaded by a counterpressure or counterforce equal in intensity to the foaming pressure or foaming force, in order to keep the gap between the upper belt and the lower belt constant. The connecting means may be provided with a safety stop or switch to prevent overloading.

Any type of pressure gauge may be used as the foaming pressure gauge, providing no changes or no appreciable changes in the interval between the two belts, i.e. the height of the section, are required for measurement.

Suitable pressure gauges include conventional hydraulic or pneumatic pressure gauges, especially those operating with reaction pressure, so that no changes in the object to be measured are needed to obtain the result. Resistance strain gauges or mechanical strain gauges and piezoquartzes or radiation measuring processes may also be used. Reference is made in this connection to the particulars in "Hutte" Vol. I, 28th Edition, chapter on measuring techniques.

In accordance with standard procedure, the measured data are compared with a predetermined required value. In the event of any deviations in the measured value from the required value, a regulator is actuated which, as already mentioned, regulates the adjusting member to be influenced (belt drive, delivery pumps, throttle valves) through a servomotor.

The invention and the process according to the invention are diagrammatically illustrated in the accompanying drawings with reference to three examples of embodiments for foaming machines. In the drawings, FIG. 1 shows a foaming machine with means for regulating the driving motor of the double belt.

In all the embodiments, the regulating means has only been diagrammatically illustrated.

Figure 1:
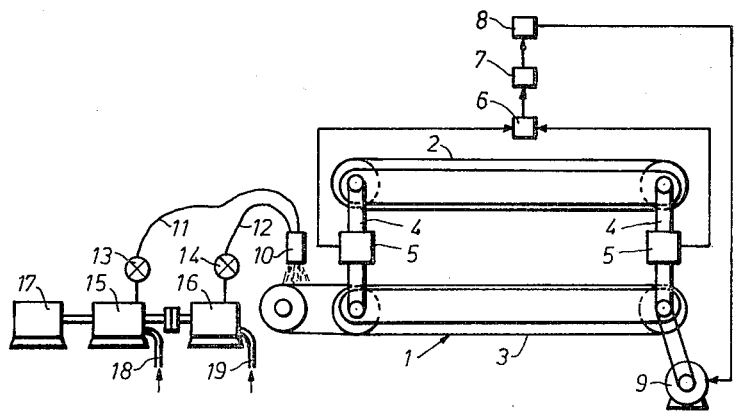

As shown in FIG. 1, the double conveyor belt 1 consists of the upper belt 2 and the lower belt 3 which are connected through telescopic guides 4, which are arranged foaming-pressure gauges 5 connected to an averaging means 6. The regulator 7 connected to the latter compares the measured value with the required value and influences the drive 9 for the double conveyor belt 1 accordingly through the servomotor 8 by increasing or by reducing it.

The mixer 10 is connected to the feed pumps 15 and 16 through pipes 11 and 12 and valves 13 and 14. The feed pumps are driven by the motor 17 and communicate through lines 18 and 19 with supply containers (not shown).

Figure 2:
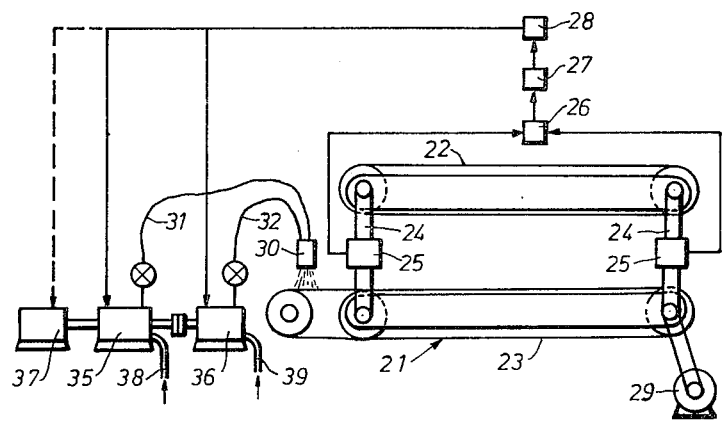
FIG. 2 shows a foaming machine with means for regulating the delivery pumps for the components to be mixed.

According to FIG. 2, the double conveyor belt 21 consists of the upper belt 22 and the lower belt 23 joined together through telescopic guides 24, on which foaming-pressure gauges 25 are arranged and connected with the averaging means 26. The regulator 27 connected to the latter compares the measured value with the required value and influences the output of the feed pumps 35 and 36 through the servomotor 28 either by adjusting their stroke or by adjusting the rotational speed of the drive 37. The drive of the double conveyor belt 1 is denoted by the reference 29. The combined mixer and applicator 30 is connected through lines 31 and 32 with the feed pumps 35 and 36. The reference 38 and 39 denote the lines leading to the supply vessel (not shown).

Figure 3:
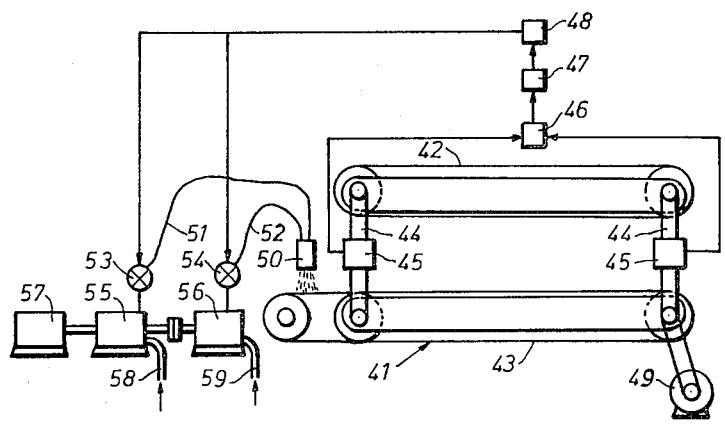
FIG. 3 shows a foaming machine with means for regulating the throttle members arranged in the lines leading to the mixer head.

In FIG. 3, the double conveyor belt 41 consists of the upper belt 42 and the lower belt 43 joined through telescopic guides 44 on which are arranged foaming-pressure gauges 45 connected with the averaging means 46. The regulator 47 connected to the latter compares the measured value with the required value and through the servomotor 48 influences the opening width of the throttle members 53 and 54 arranged in the lines 51 and 52 leading from the mixer and applicator 50 to the feed pumps 55 and 56. Lines 58 and 59 lead from the feed pumps to the supply vessels (not shown). The reference 57 denotes the drive for the feed pumps 55 and 56, whilst the reference 49 denotes the drive for the double conveyor belt 41.

We claim:
1. In an apparatus for making foam articles comprising:
   a. a double belt conveyor with a lower belt and an upper belt, and a drive means therefor,
   b. feeding means for feeding a composition to form the foam to the double belt conveyor, the improvement which comprises;
   c. said upper and lower belts being interconnected by first and second elastic telescopic guides disposed respectively at spaced locations along the length of the belt and responsive to pressure of the foaming reaction imposed on the belts,
   d. pressure measuring means operatively connected to each of the elastic telescopic guides including averaging means for measuring the foaming pressure,
   e. comparing means for comparing the foaming pressure sensed by the pressure measuring means with a selected foaming pressure to be maintained between the conveyor belts,
   f. servomotor means responsive to the difference in said pressures sensed by the comparing means,
   g. feed control means for varying the feed rate of said composition per unit area of said lower belt,
   h. said servomotor means being effective to actuate the feed control means to compensate for said pressure difference, for increasing said feed rate when the pressure decreases and decreasing the feed rate when said pressure increases.

2. Apparatus according to claim 1, said feed control means comprising a variable speed drive for the conveyor drive means for varying the speed of the conveyor belts.

3. Apparatus according to claim 1, said feed control means comprising means for controlling said feeding means to vary the feed rate of said composition per unit time.

4. Apparatus according to claim 3, said feeding means comprising a pump for pumping to the double belt conveyor composition for said foam, said feed control means comprising means for controlling the pumping rate of said pump.

5. Apparatus according to claim 3, said feeding means comprising a pump for pumping to the double belt conveyor composition for said foam, and a pipe for delivery of the discharge of the pump to the double belt conveyor, said feed control means comprising means for throttling flow through said pipe.

6. A foaming machine for production of foam articles, comprising a driven double conveyor belt with a lower belt and an upper belt and an applicator for composition to form the foam, wherein the upper belt and lower belt of the double belt conveyor are interconnected by first and second elastic telescopic guides disposed respectively at spaced locations along the length of the belt and responsive to pressure of the foaming reaction on the belts, the double belt conveyor is outfitted with a pressure measuring means operatively connected to each of the elastic telescopic guides including averaging means for measuring the foaming pressure, said pressure measuring means is coupled with the driving motor of the double conveyor belt through a regulator and a servomotor for influencing the feed rate per unit area by varying the rate of travel of the belts.

7. A foaming machine for production of foam articles comprising a driven double conveyor belt with an upper and lower belt and an applicator equipped with a feed pump for the composition to form the foam wherein the upper belt and lower belt of the double belt conveyor are interconnected by first and second elastic telescopic guides disposed respectively at spaced locations along the length of the belt and responsive to pressure of the foaming reaction on the belts, the double belt conveyor is outfitted with pressure measuring means operatively connected to each of the elastic telescopic guides including averaging means for measuring the foaming pressure, and the pressure measuring means is coupled with the feed pump through a regulator and a servomotor for influencing the feed rate per unit area by varying the pumping rate.

8. A foaming machine for production of foam articles comprising a driven double conveyor belt with an upper and a lower belt and an applicator equipped with a feed pump for the composition to form the foam, adjustable throttle means being arranged in the feed lines between the feed pump and the applicator, wherein the upper and lower belt of the double belt conveyor are interconnected by first and second elastic telescopic guides disposed respectively at spaced locations along the length of the belt and responsive to pressure of the foaming reaction on the belts, the double belt conveyor is outfitted with pressure measuring means operatively connected to each of the elastic telescopic guides including averaging means for measuring the foaming pressure, and the pressure measuring means is coupled with the throttle means through a regulator and a servomotor for influencing the feed rate per unit area by varying the feed rate to the applicator.

9. In apparatus for making foam articles comprising:
 a. a double belt conveyor with a lower belt and an upper belt, and a drive means therefor,
 b. feeding means for feeding a composition to form the foam to the double belt conveyor, the improvement which comprises:
 c. first and second pressure measuring means disposed respectively at spaced intervals along the length of the belt and averaging means for measuring the foaming pressure during production of the foam between the upper and lower belts,
 d. comparing means for comparing the foaming pressure sensed by the pressure measuring means with a selected foaming pressure to be maintained between the conveyor belts,
 e. servomotor means responsive to the difference in said pressures sensed by the comparing means,
 f. feed control means for varying the feed rate of said composition per unit area of said lower belt,
 g. said servomotor means being effective to actuate the feed control means to compensate for said pressure difference, for increasing said feed rate when the pressure decreases and decreasing the feed rate when said pressure increases.

* * * * *